(12) United States Patent
Moses

(10) Patent No.: US 9,067,463 B2
(45) Date of Patent: Jun. 30, 2015

(54) TIRE TRACTION DEVICE

(71) Applicant: Donnell Moses, Lake Park, FL (US)

(72) Inventor: Donnell Moses, Lake Park, FL (US)

(*) Notice: Subject to any disclaimer, the term of this patent is extended or adjusted under 35 U.S.C. 154(b) by 143 days.

(21) Appl. No.: 14/036,125

(22) Filed: Sep. 25, 2013

(65) Prior Publication Data

US 2015/0083815 A1  Mar. 26, 2015

(51) Int. Cl.
 *B60B 39/12* (2006.01)
(52) U.S. Cl.
 CPC .................................... *B60B 39/12* (2013.01)
(58) Field of Classification Search
 CPC ........ B60B 39/00; B60B 39/12; B60C 11/00; B60C 11/02; B60C 19/00; B60C 27/00; B60C 27/02; B60C 27/003; B60C 27/04; B60C 27/06
 See application file for complete search history.

(56) References Cited

U.S. PATENT DOCUMENTS

| | | | | |
|---|---|---|---|---|
| 2,680,567 A * | 6/1954 | Steven | | 238/14 |
| 3,630,440 A * | 12/1971 | Sams | | 238/14 |
| 3,797,549 A | 3/1974 | Lieberum | | |
| 3,878,988 A * | 4/1975 | Blais | | 238/14 |
| 4,211,366 A | 7/1980 | Czarnota | | |
| 4,225,082 A * | 9/1980 | Granryd | | 238/14 |
| 4,227,562 A | 10/1980 | Adair | | |
| 4,568,020 A * | 2/1986 | Gallichan | | 238/14 |
| 4,662,417 A | 5/1987 | Lee | | |
| 4,709,432 A * | 12/1987 | Barrick | | 7/100 |
| 4,960,160 A | 10/1990 | Stacy | | |
| 4,998,670 A | 3/1991 | Peterson | | |
| 5,156,695 A | 10/1992 | Martin | | |
| 5,332,152 A | 7/1994 | Alwafaie et al. | | |
| 5,443,225 A | 8/1995 | Tracy et al. | | |
| 5,454,412 A * | 10/1995 | Bowers | | 152/221 |
| 5,513,684 A | 5/1996 | Laub | | |
| 5,569,340 A * | 10/1996 | Ulrich | | 152/225 C |
| 5,833,136 A | 11/1998 | Japp | | |
| 6,129,289 A * | 10/2000 | Morin, Jr. | | 238/14 |
| 6,394,362 B1 * | 5/2002 | Kramr | | 238/14 |
| 6,401,775 B1 * | 6/2002 | Sood et al. | | 152/225 C |
| 6,779,738 B1 * | 8/2004 | Stannard | | 238/14 |
| 7,165,658 B1 * | 1/2007 | Kehoe | | 188/4 R |
| 7,350,719 B1 * | 4/2008 | Brenner | | 238/14 |
| 7,404,524 B2 | 7/2008 | Mathieu | | |
| 7,543,618 B2 * | 6/2009 | Stewart | | 152/213 R |
| 8,151,844 B2 * | 4/2012 | Stewart | | 152/213 R |
| 8,167,219 B2 | 5/2012 | Lynn | | |
| 8,210,443 B2 | 7/2012 | Studstill | | |

(Continued)

FOREIGN PATENT DOCUMENTS

CA  497332  11/1953

*Primary Examiner* — Jason C Smith
(74) *Attorney, Agent, or Firm* — McHale & Slavin, P.A.

(57) ABSTRACT

A tire traction device having a tire arm about the width of a tire, roughly conforming the radial curvature of the tire and removably secured thereto, a spring-loaded shock pivotably attached to one end of the tire arm, and a traction track pivotably connected to opposite end of shock. The track includes a series of successively interconnected frames that pivot about each other, the first frame adjacent to the arm and pivotably connected thereto includes a tapered end. In use, the arm is placed about the tire and the tapered end of the first frame is wedged between the tire and the tractionless surface, the remaining frames can be laid flat or staggered. Upon rotation of the tire, the arm is rotated thereabout until releasing after contact with the first frame, whereby instantaneously the first frame and successive frames form a flat traction surface for the tire to rotate about.

16 Claims, 6 Drawing Sheets

(56) References Cited

U.S. PATENT DOCUMENTS

| | | | |
|---|---|---|---|
| 8,397,772 B1* | 3/2013 | Faridoon | 152/185.1 |
| 8,439,096 B2 | 5/2013 | Maltezos | |
| 8,448,877 B1 | 5/2013 | Aubin | |
| 2002/0029718 A1* | 3/2002 | Martin | 104/139 |
| 2007/0193668 A1* | 8/2007 | Mathieu | 152/171 |
| 2012/0193439 A1* | 8/2012 | Brown et al. | 238/14 |
| 2012/0273582 A1 | 11/2012 | Lynn | |
| 2015/0083815 A1* | 3/2015 | Moses | 238/14 |

* cited by examiner

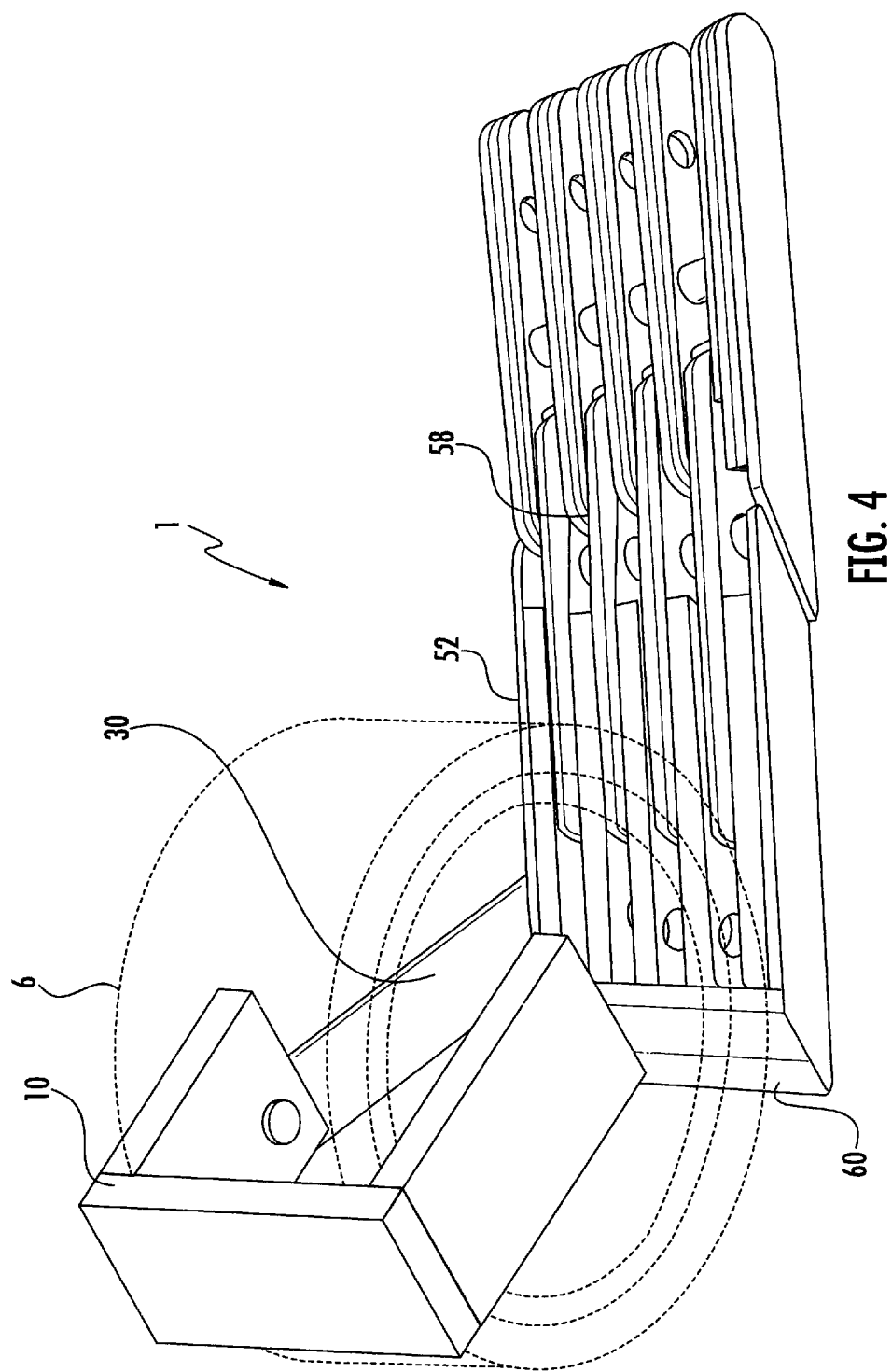

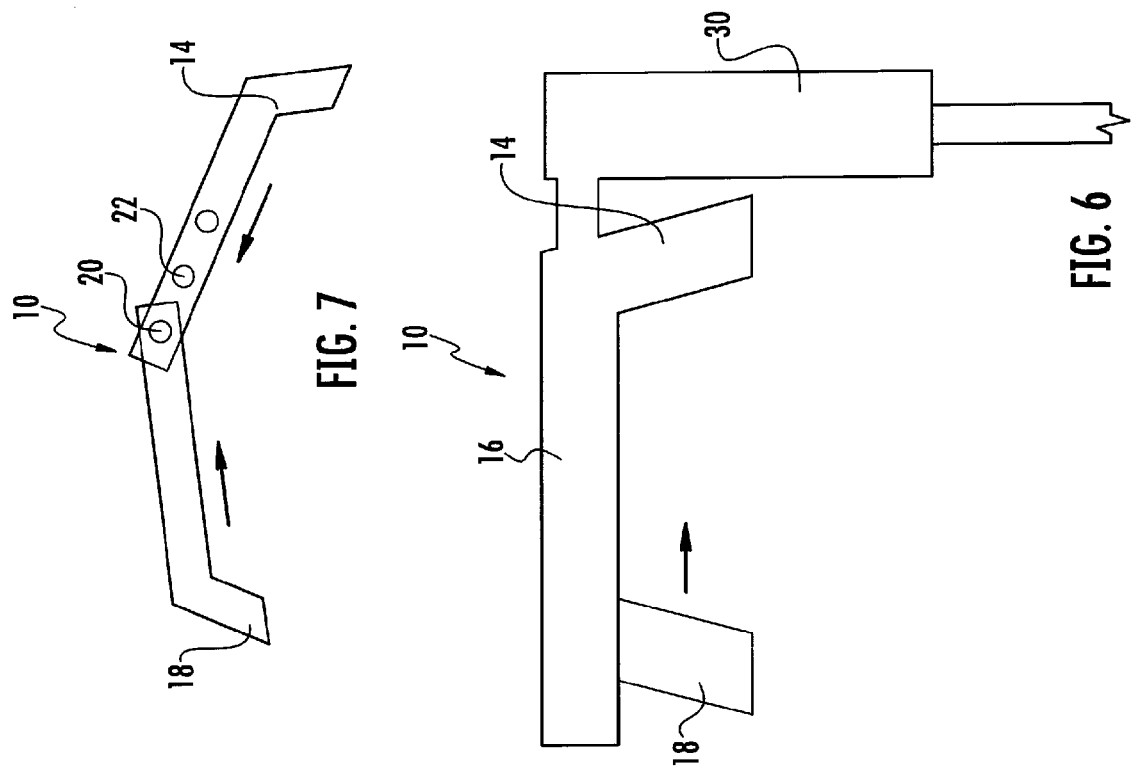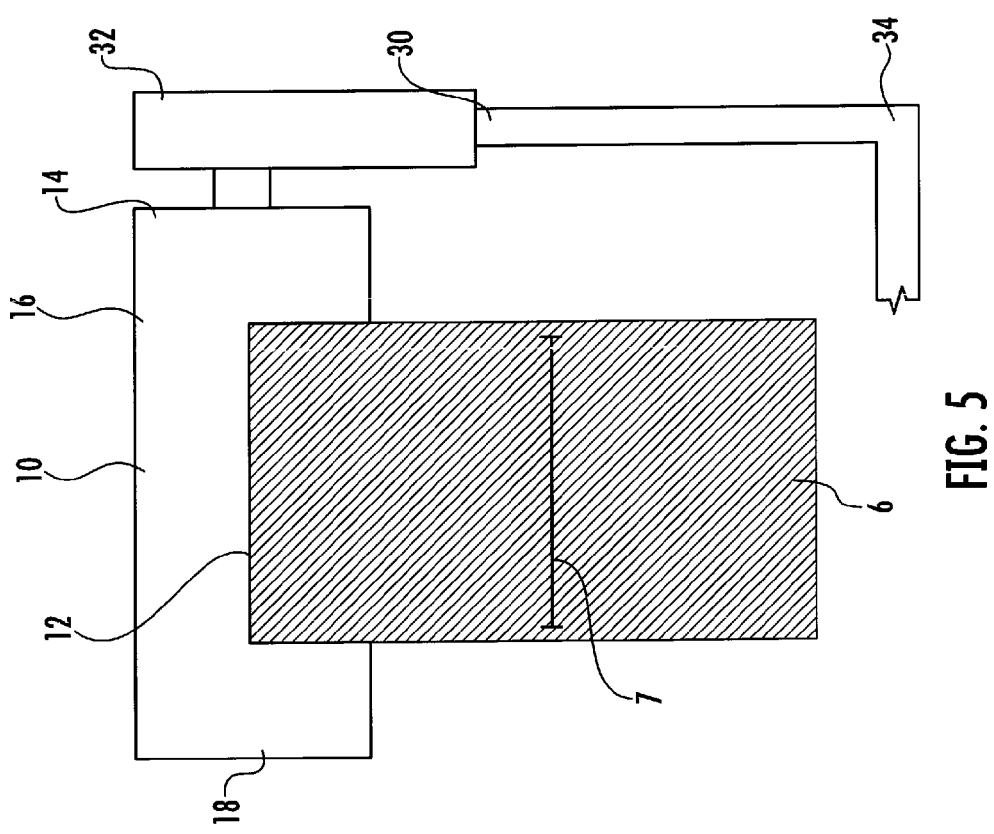

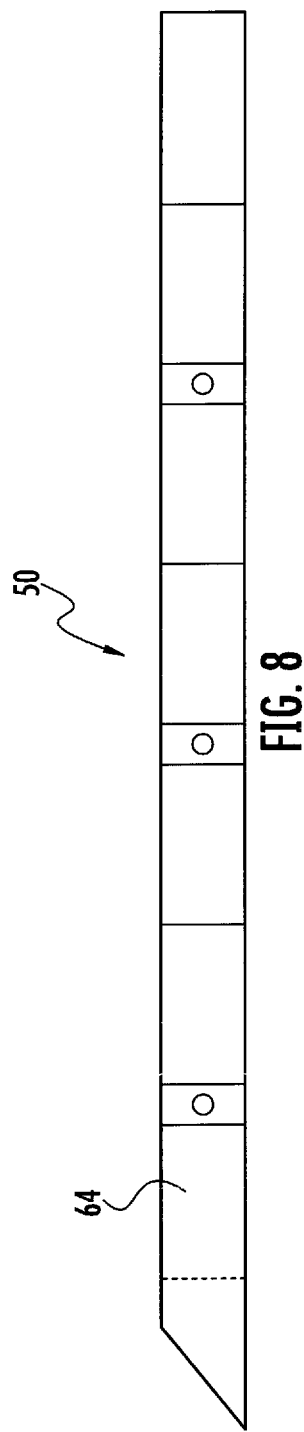
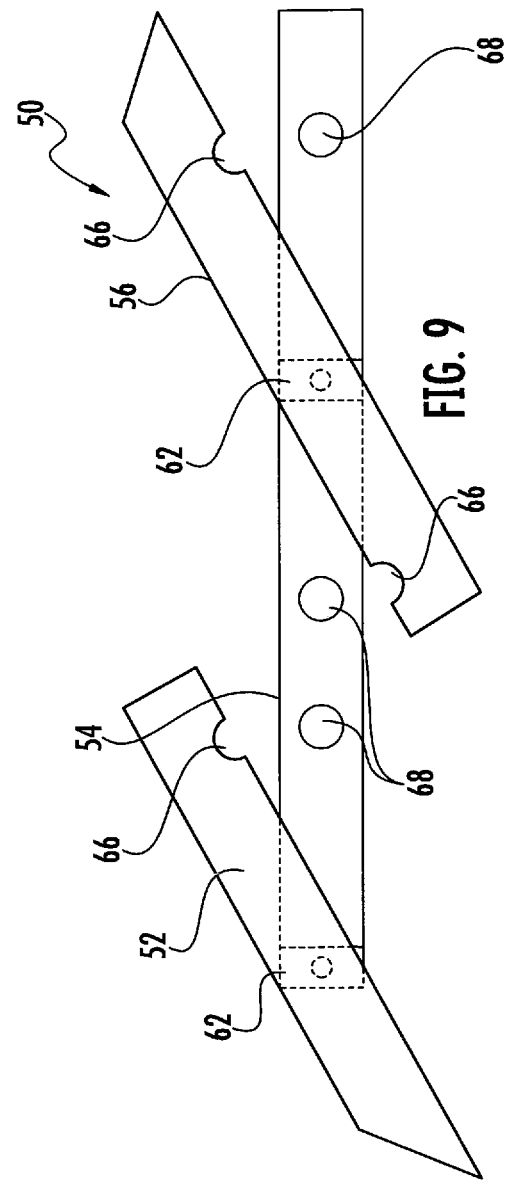
FIG. 8
FIG. 9

TIRE TRACTION DEVICE

FIELD OF THE INVENTION

This invention relates generally to the field of traction devices for vehicles operating in soft terrain and, in particular, to a device that temporary secures to a vehicle wheel that is stuck in soft terrain to provide the appropriate traction to allow the vehicle to escape the soft terrain.

BACKGROUND OF THE INVENTION

Vehicles of various makes and models have become the primary mode of travel throughout the world. Such vehicles may be used for personal, commercial, or military uses. Highways, byways, and other roads are built of differing products such as concrete, asphalt, sand, gravel or the like providing a vital infrastructure for support of a region. Maintenance and upkeep of these roads help ensure the availability of these surfaces for a variety of uses. However, these roads are not always safe for travel for various reasons and in many instances may not even exist. Further, maintenance of roads can be most difficult as weather conditions such as excessive rain, snow, or ice can create challenges for vehicle operators. In many parts of the world, the roads or road shoulders may be unpaved and consist of a sandy base or saturated soil. A particular requirement for military vehicles is the ability to be driven on paved roads, but also on non-paved terrain like sandy dessert-like areas. Should a vehicle lose traction on such surfaces, there is a high risk that a specialty vehicle will be required to extricate the stuck vehicle.

Traction in a general sense relates to the grip of the tire upon the surface over which the vehicle is being driven. Under ordinary driving conditions the torque delivered to the vehicle wheel presses the wheel against the surface long enough to develop sufficient traction required for moving the vehicle at a desired rate of speed. However, under certain conditions the surface of the road may not provide sufficient traction as a result of the low coefficient of friction available. An additional contributory factor to the lack of traction under weather conditions of snow and ice is the heat given off by the friction of the tires, which melts the snow or ice on the road surface, creating a glazed condition. In contrast, under very loose, extremely wet or sandy soil conditions cause the tires to lose grip, the weight of the vehicle may cause it to sink, resulting it to be mired in place. When vehicles become stuck, it is often necessary to obtain third party assistance in moving the vehicle to a position where traction can be restored. This may require an extended period of time during which the vehicle operator and/or the vehicle itself can be exposed to additional challenges or risks. This can be most problematic in the case with military vehicles, abandoning a military vehicle for even a short time may place the vehicle and personnel in harms way.

Various solutions have been proposed to overcome these problems by providing devices intended to improve traction of the vehicle. Drivers sometimes carry materials in their vehicles which may aid in improving tire traction, such as sand if their vehicle becomes stuck on icy, snowy, or muddy roads. If the vehicle is stuck in mud or sand, yet another technique is necessary. Numerous other devices have been used including clamps, boards, burlap bags, pieces of carpeting, expanded metal and so forth for use in vehicle extraction. Such items may be effective for one condition, but not another. For instance, use of sand to obtain traction on ice would be effective but sand would not be effective on mud.

Traction devices for extricating a vehicle from conditions varying from mud to ice are wide and varied. Many involve placing some sort of flat traction surface beneath the wheel of a vehicle, wherein the stuck vehicle climbs up on the traction surface thereby extricating the vehicle from its predicament. For example, U.S. Publication No. 2012/0273582 includes a board having a first and second end, with one or more sections in between, a rough or grooved top surface, and a plurality of spikes extending from the bottom surface thereof. The mat provides traction to a wheel of a vehicle, whereby the board may be drawn underneath a spinning tire.

Traction mats have been used by vehicles for many years to enable the vehicle to be driven out of a rut, pothole, or the like by gaining additional traction from materials placed into the path of the drive wheel. Other traction mats are attachable to the tire, for example, U.S. Pat. No. 3,797,549, includes a flexible base having sufficient length to encircle the tread face of a tire, a projecting means extending from one surface adapted to run on a road surface, and a suction means extending from opposite surface adapted by deformation to be brought into operative engagement with and grip the tread face tire, thus releasably securing tread device to the tire. The prior art is replete with mats having indentations in their surface, mats formed of various materials, including sheets of metal with openings or indentation therein, and in some cases, studs fastened to the mat. Such devices of the prior art have proven unsatisfactory for numerous reasons, including being overly expensive to manufacture and sell, unsafe to handle because of sharp edges, snow or mud packing between the protuberances on the mat causing loss of traction, and difficulty in attachment and operation. For example, U.S. Pat. No. 6,401,775, which discloses a metal shoe about the width of a tire roughly conforming to the radial curvature of the tire, multiple conical sharp or blunt projections on the outer surface of the shoe, a side plate attached to one side of the shoe at one end and a hole at the opposite end, plus a right angled bar attachable to the hole on the side plate on one end and an opposite end which passes through the existing gaps in the wheel rim, a combination of parts to create increased traction for the wheel.

Sandy soil presents a unique problem and one that many military vehicles face in the Middle East. While applying the throttle is the first thing one instinctively does when it appears that the vehicle will get stuck, it is essential not to accelerate in excess as the spinning of the tires may result in the tire being further dig in. Traction devices that exist for situations where the tire is stuck in sand include U.S. Pat. No. 3,630,440 which discloses a friction plate for placement under an automobile wheel comprised of a woven mat with downwardly extending spikes to grip the road surface, and upwardly non-puncturing nail heads for engaging the tire. Additionally, along one end of the mat there will be an integral collar, to be mounted on the wheel lug bolts and secured temporarily thereto. The disadvantage associated with this device is the requirement of having tools necessary to mount the collar onto the wheel lug bolts.

Thus what is lacking in the art is a traction device to provide traction to a vehicle wheel in order to escape soft or frozen terrain by means of temporary securement to the vehicle wheel.

SUMMARY OF THE INVENTION

A tire traction device having an adjustable tire arm roughly conforming to the radial curvature of a tire and removably secured thereto, a spring loaded shock pivotably attached to one end of the tire arm, and a traction track formed from a series of interconnected frames having spacers pivotably connected to the opposite end of spring loaded shock. A first frame is positioned adjacent to the arm and pivotably connected thereto includes a tapered end. The tapered end is intended to be wedged between the tire and the tractionless surface. In use, the arm is placed about the tire and the tapered end of the first frame is wedged between the tire and the tractionless surface. The remaining interconnected frames can be laid flat or staggered, each frame having spaced apart reinforcing members. Upon rotation of the tire, the arm is rotated thereabout until releasing after contact with the first frame, whereby instantaneously the first frame and successive frames form a flat traction surface for the tire to rotate upon.

Accordingly, it is an objective of the instant invention to provide a tire traction device for use under a wheel of a motor vehicle in an emergency situation, such as soft terrain, sand, snow, or ice.

It is a further objective of the instant invention to provide a tire traction device which can be easily installed and removed without first requiring the vehicle to be raised by means of a jack and without requiring the use of tools to install the device and later remove it.

It is yet another objective of the instant invention to provide a tire traction device that can be quickly placed into operative use having an adjustable tire arm, adaptable to various tire sizes, which also allows adequate inner fender clearance.

It is further an objective of the instant invention to provide a tire traction device which can be quickly tethered to the vehicle so that after the car can be moved out of a ditch.

It is a still further objective of the instant invention to provide a tire traction device which is not kicked away by the wheel or lost upon extraction, as well as a device that can be folded and stored away after use.

It is an additional objective of the instant invention to provide a tire traction device that will be easily stored, safely handled when applied and not cause injury to persons or damage to the vehicle, the driving tire, or adjacent objects when used.

It is an additional objective of the instant invention to provide a tire traction device that includes a traction track having a lattice of reinforcing members running parallel to the longitudinal sidewall of each track, whereby soft terrain (extremely saturated), sand, snow, or ice can pass therethrough so that the entire track digs into the tractionless surface to provide a traction surface for the tire.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 4 is an isometric view of the instant invention in use;
FIG. 5 is top view of the wheel support of the instant invention;
FIG. 6 is a top view of an alternative embodiment of the wheel support of the instant invention;
FIG. 7 is a top view of an alternative embodiment of the wheel support of the instant invention;
FIG. 8 is a side view of the traction track of the instant invention;
and
FIG. 9 is a side view of the traction track of the instant invention.

DETAILED DESCRIPTION OF THE INVENTION

Figure 1:
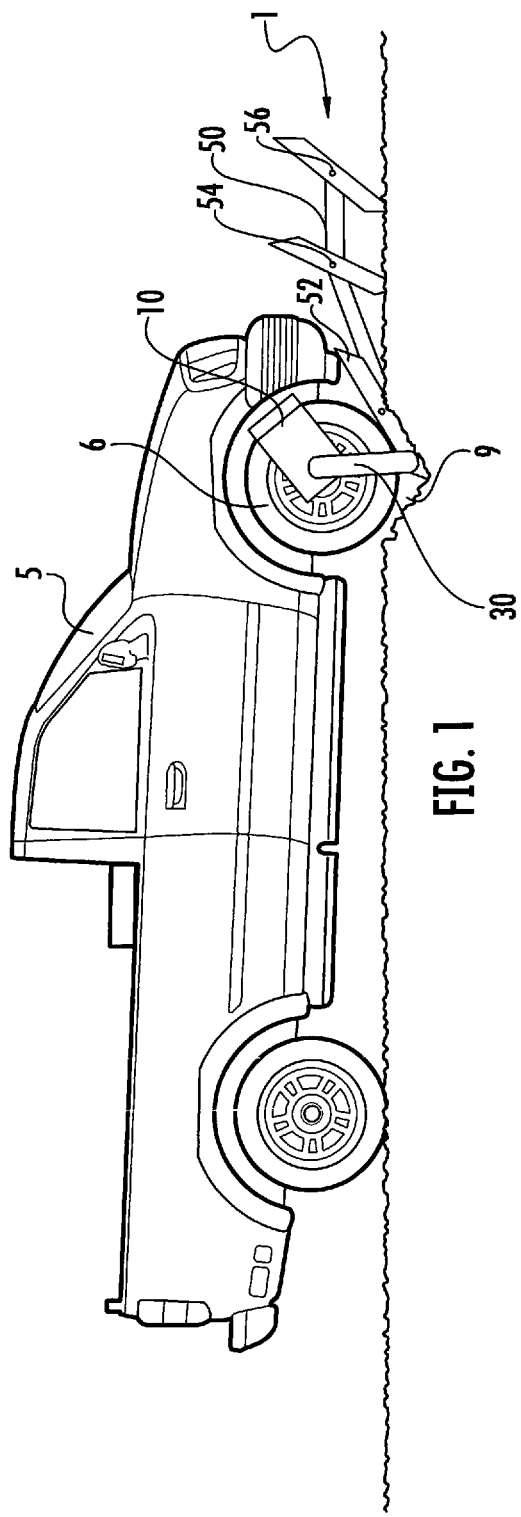
FIG. 1 is a pictorial representation of the instant invention.

As shown in FIG. 1, a tire traction device 1 having a tire arm 10 about the width of a tire 6, roughly conforming the radial curvature of the tire 6, removably secured thereto, a spring loaded shock 30 pivotably attached to one end of the tire arm 10, and a traction track 50 pivotably connected to opposite end of spring loaded shock 30. As shown in FIGS. 1-4, in use the tire arm 10 is placed about the tire 6 and the tapered end 60 of the first frame 52 is wedged between the tire 6 and the tractionless surface 9, the remaining interconnected frames 54 and 56 can be laid flat or staggered; then, upon rotation of the tire 6, the tire arm 10 is rotated thereabout until releasing after contact with the first frame 52, whereby instantaneously the first frame 52 and successive frames 54 and 56 form a flat traction surface 58 for the tire 6 to rotate about.

Figure 2:
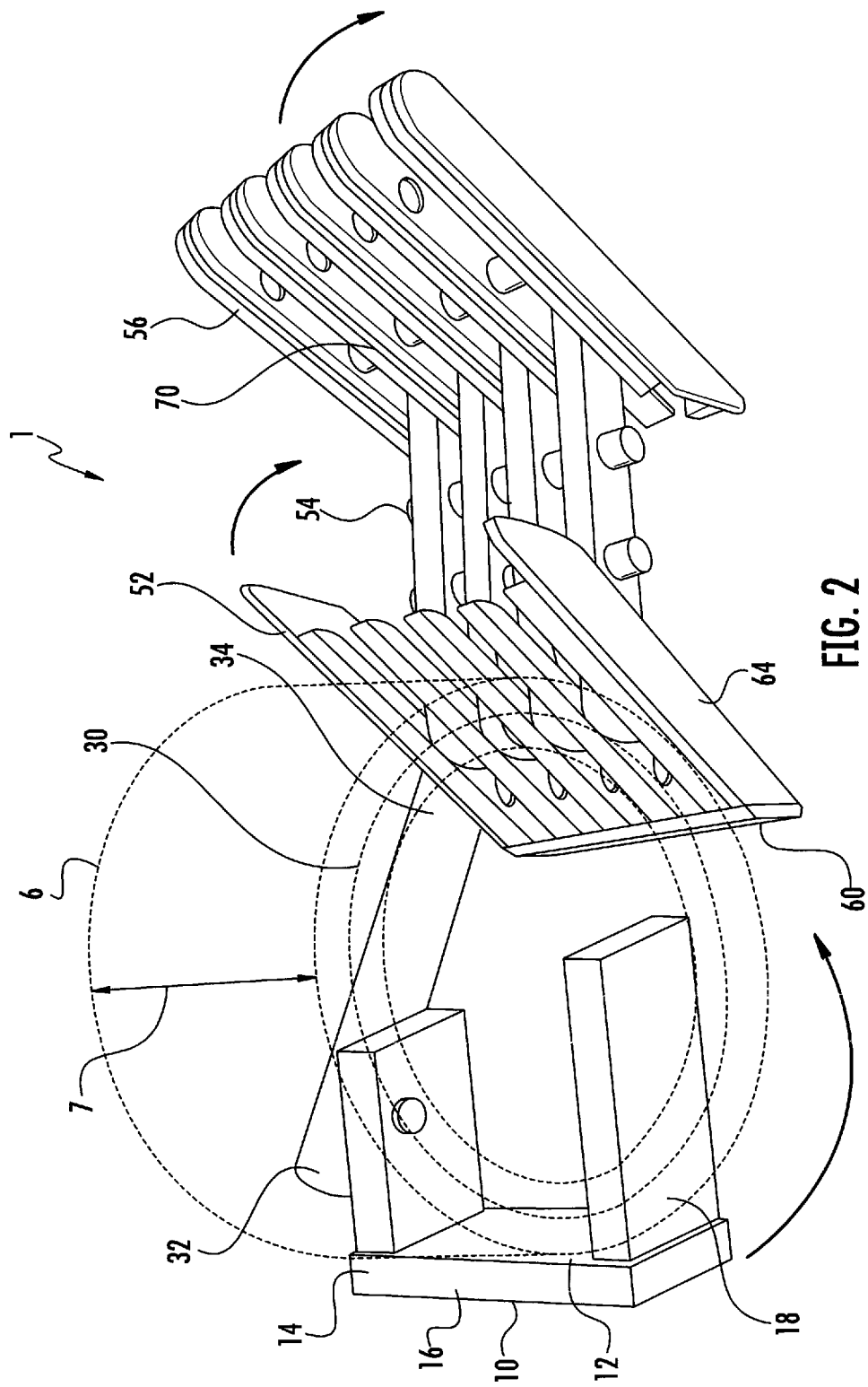
FIG. 2 is an isometric view of the instant invention in use.
Figure 3:
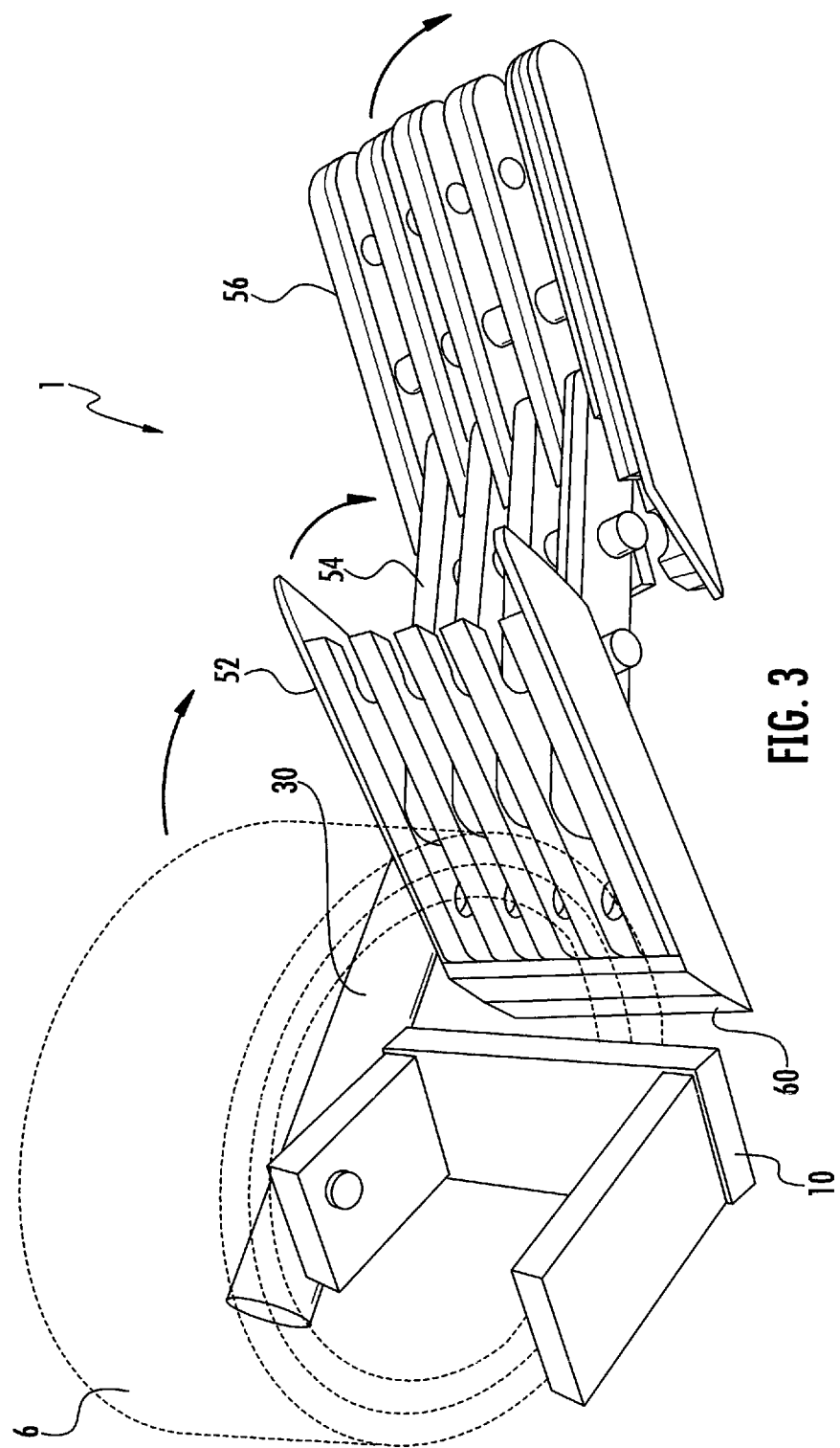
FIG. 3 is an isometric view of the instant invention in use.

As shown in FIG. 2, the tire arm 10 having the width of the tire 6 and roughly conforming to the radial curvature of the tire 6 is placed thereabout. The tire arm 10 does not require use of tools to be installed about the tire 6. The tire arm 10 further includes a spring loaded shock 30 is pivotably attached to one end 14 of the tire arm 10 to accommodate various tire lengths. A spring member within the shock 30 is used to draw the tire arm allowing for self adjustment to the size of the tire. Additionally, the tire arm 10 may be adjustable to accommodate various tire widths, as discussed below. Therefore, the traction device 1 is capable of being used with personal, commercial, or military vehicles; where tire lengths and widths shall vary. Attached to the opposite end 34 of the spring loaded shock 30 is the traction track 50. The first frame 52 of the traction track 50 is wedged between the tire 6 and the tractionless surface 9, the remaining interconnected frames 54 and 56 can be laid staggered or flat (not shown). Additionally, the first frame 52 need not be in the upright position when wedged against the tire 6; the first frame 52 may also be wedged against the tire 6 and laid flat/perpendicular (not shown) to the tractionless surface 9. As shown in FIGS. 2-4, the tire 6 begins to rotate and the tire arm 10 begins to rotate with the tire 6 as well. The traction track 50, specifically the first frame 52, slowly begins to move perpendicular to the tractionless surface 9. As the tire 6 rotates the spring loaded shock 30 will also begin to expand, since the distance between the first frame 52 and the point of contact between the tire arm 10 and the tire 6 will increase. As shown in FIG. 4, the tire arm 10 is now released from the tire 6 as it has almost completed an entire rotation. Upon rotation of the tire 6, the arm 10 is rotated thereabout and releases after contact with the first frame 52, whereby instantaneously the first frame 52 and successive frames 54 and 56 form a flat traction surface 58 for the tire 6 to rotate on.

The tire arm 10 can be L-shaped (not shown) or U-shaped 12, so long as it conformed to the width of the tire 6. It is contemplated that the inside portion of the tire arm 10 have a rough surface for frictional engagement with the tire tread (not shown). As shown in FIGS. 6 and 7, alternative embodiments of the tire arm 10 are contemplated. The adjustable tire arm 10, whereby the tire arm 10 support is adaptable to various tire sizes, allows adequate inner fender clearance and can be quickly placeable into operative use. In FIG. 6, the adjustable tire arm 10 is U-shaped 12 having opposing side arms 14 and 18. The first arm 14 and second arm 18 are angled outward to allow for more tire width clearance. The first arm 14, closest to the spring loaded shock is fixed; the second arm 18 is adjustable. The second arm 18 is slidable along the straight arm portion 16 of the tire arm 10 through the use of notches, a threaded bolt, or most any mechanism for use in drawing the first and second arms together. As shown in FIG. 7, the second arm 18 rotates about a pivot point 20 and adjusts along the length of the first arm 14. The second arm 18 pivots about the first arm 14 and when a desired width is reached the second arm 18 is hooked onto a notch 22 located on the first arm 14 and secured into place.

As shown in FIGS. 8 and 9, the track includes a series of at least three successively interconnected frames 52, 54, and 56 that pivot about each other. The first frame 52 adjacent to the tire arm 10 and pivotably connected thereto includes a tapered end 60. The tapered end 60 is intended to be wedged between the tire 6 and the tractionless surface 9. Each successive frame has a similar construction. The point of axis of rotation 62 is located along the sidewall 64 of each frame. Each frame is quadrilateral. The traction track 50 further includes a series of parallel reinforcing members 70, running parallel to the longest sidewall 64 of each frame, more aptly shown in FIG. 2. The reinforcing members 70 provide strength to each frame as well as prevent protuberances of snow or mud from packing thereinbetween which can cause loss of traction. The reinforcing members 70 further allow soft terrain (extremely saturated or sand), snow, or ice to pass therethrough so that the entire track digs into the tractionless surface to provide a traction surface for the tire. The spaced apart reinforcing members 70 provide a fillable area for material to provide traction, which the frame distributes the weight of the vehicle. As the weight of the tire begins to press upon the first frame it pushes the frame onto the tractionless surface, should the tractionless surface be made up of soft terrain, sand, snow, or ice, then that soft terrain, sand, snow, or ice will be pushes thereinbetween the parallel reinforcing members. The compaction of material into the reinforcing members will provide a sturdier track for the tire to rotate upon and operate to distribute the vehicle weight. As the tire moves further along the traction track unto the second frame and then successive frames, the same occurs. On the first frame 52 and last frame 56 along the sidewall is an opening 66 shaped to adapt to a corresponding notch 68 on the abutting frame 54. The first frame 52 pivots about the successive frame 54 and when in a flat position the opening 66 removeably attaches to the notch 68 on the abutting frame 54. Similarly, the last frame 56 pivots about the preceding frame 54, and when in a flat position, the opening 66 along the sidewall 64 thereof removeably attaches to the notch 68 on the preceding frame 54. The openings 66 and notches 68 are located along the length of the longest two sidewalls 64. Furthermore, the frame 54 abutting the first frame 52 and each successive frame is constructed of a width slightly smaller than that of the preceding frame. The smaller width allows the frames to interconnect when in the flat position, the different widths are constructed and arranged to provide traction by acceptance of material between the members. It is contemplated that the traction track 50 have a width of approximately 9 to 10 inches to accommodate most every width tire 6, although the width should not be limiting. After use, the device can be cleaned and then collapsed into a storage position for future use.

In a preferred embodiment, the traction device 1 is constructed of hard non-skid recycled plastic. Recycled plastic provides a light-weight material that allows for ease in handling and storage. The use of the tire arm for removably securing the device to a vehicle tire provides a coupling along the width of a vehicle tire by conforming to the radial curvature of the vehicle tire. The traction track, which is pivotally attached to a shock coupled to the tire arm, provides a tire traction top surface for a vehicle tire to rotate upon and the spaces between the successive interconnected quadrilateral frames that pivot about each other are available for receipt of material for optimum traction. Aluminum or other materials may also be used.

All patents and publications mentioned in this specification are indicative of the levels of those skilled in the art to which the invention pertains. All patents and publications are herein incorporated by reference to the same extent as if each individual publication was specifically and individually indicated to be incorporated by reference. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A tire traction device for temporary securement to a vehicle tire in order to escape soft terrain comprised of:
a tire arm member removably secured to a vehicle tire, said tire arm member constructed and arranged to span the width of a vehicle tire and conform to the radial curvature of the vehicle tire;
a shock member having a first end and a second end, said first end pivotally attached to one end of said tire arm; and
a traction track formed from at least two successive interconnected quadrilateral frames that are pivotally secured together, each frame formed from a plurality of parallel reinforcing members form a longitudinal sidewall of each said frame with a series of spaced apart reinforcing members therebetween, said track having a tire traction top surface for a vehicle tire to rotate upon, and a bottom surface for engaging the earth by permitting earth material to pass thereinbetween;
whereby said tire arm is placed about a vehicle tire and said traction track is wedged against said vehicle tire and the earth and upon rotation of said vehicle tire said arm is rotated thereabout until releasing after contact with said track and positioning a traction surface for said vehicle tire to rotate about.

2. The tire traction device of claim 1, wherein said shock member comprises a spring for capable of retracting a space between said tire arm and said track.

3. The tire traction device of claim 1, wherein said tire arm includes a free first arm, a straight arm, and a second arm forming a U-shaped structure.

4. The tire traction device of claim 3, wherein said free first arm is slidably engageable along the length of said straight arm for controlling a width between said first arm and said second arm.

5. The tire traction device of claim 1, wherein each said traction track frame has a width about the width of a vehicle tire.

6. The tire traction device of claim 1, wherein said first frame is pivotally connected to said second end of said shock and includes a tapered end, and an opposite end on said first frame connected to said second frame.

7. The tire traction device of claim 6, wherein each said frame has a point of axis of rotation relative to said successive frame located along said longitudinal sidewall of each said frame.

8. The tire traction device of claim 7, wherein said second frame abutting said first frame, and every other successive frame is constructed of a smaller width than that of the preceding frame, whereby said frames interconnect to form a flat uniform traction surface for a vehicle tire to rotate about.

9. The tire traction device of claim 1, wherein said tire traction device is constructed of recycled plastic.

10. A tire traction device for temporary securement to a vehicle tire in order to escape soft terrain comprised of:
- a tire arm member removably secured to a vehicle tire, said tire arm member having a first arm and a second arm, said first arm adjustable to span the width and radial curvature of a vehicle tire;
- a shock member having a first end and a second end that is drawn together by a spring, said first end pivotally attached to one end of said tire arm; and
- a traction track formed from at least two successive interconnected quadrilateral frames that are pivotally secured together, each frame formed from a plurality of parallel reinforcing members form a longitudinal sidewall of each said frame with a series of spaced apart reinforcing members therebetween, said track having a tire traction top surface for a vehicle tire to rotate upon, and a bottom surface for engaging the earth by permitting earth material to pass thereinbetween;
- whereby said tire arm is placed about a vehicle tire and said traction track is wedged against said vehicle tire and the earth and upon rotation of said vehicle tire said arm is rotated thereabout until releasing after contact with said track and positioning a traction surface for said vehicle tire to rotate about.

11. The tire traction device of claim 10, wherein said tire arm includes a free first arm, a straight arm, and a second arm forming a U-shaped structure.

12. The tire traction device of claim 10, wherein each said traction track frame has a width about the width of a vehicle tire.

13. The tire traction device of claim 10, wherein said first frame is pivotally connected to said second end of said shock and includes a tapered end, and an opposite end on said first frame connected to said second frame, each said frame has a point of axis of rotation relative to said successive frame located along said longitudinal sidewall of each said frame.

14. The tire traction device of claim 13, wherein said second frame abutting said first frame, and every other successive frame is constructed of a smaller width than that of the preceding frame, whereby said frames interconnect to form a flat uniform traction surface for a vehicle tire to rotate about.

15. The tire traction device of claim 10, wherein said tire traction device is constructed of recycled plastic.

16. The tire traction device of claim 14, wherein said tire traction device is constructed of aluminum.

\* \* \* \* \*